US 6,625,361 B2

(12) United States Patent
Park et al.

(10) Patent No.: US 6,625,361 B2
(45) Date of Patent: Sep. 23, 2003

(54) METHOD FOR FORMING TWO THIN CONDUCTIVE FILMS ISOLATED ELECTRICALLY FROM EACH OTHER ON A FIBER

(75) Inventors: Sahng-gi Park, Daejon (KR); Jong-bae Kim, Daejon (KR); Doo-hee Cho, Daejon (KR); Yong-gyu Choi, Daejon (KR); Kyong-hon Kim, Daejon (KR); Bun Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 9 days.

(21) Appl. No.: 10/085,371
(22) Filed: Feb. 27, 2002
(65) Prior Publication Data
US 2003/0108314 A1 Jun. 12, 2003
(30) Foreign Application Priority Data
Dec. 12, 2001 (KR) .................... 2001-0078667
(51) Int. Cl.[7] ................................. G02B 6/00
(52) U.S. Cl. ................. 385/123; 385/2; 385/8
(58) Field of Search ............... 438/31, 32, 65, 438/69; 385/2, 3, 8, 10, 37, 40, 122, 123, 127, 128, 146, 147; 216/13–16

(56) References Cited
U.S. PATENT DOCUMENTS 5,077,087 A * 12/1991 Byer et al. .............. 65/390
5,182,783 A * 1/1993 Bosc et al. ............. 385/123
6,097,867 A * 8/2000 Brueck et al. .......... 385/122
6,285,812 B1 * 9/2001 Amundson et al. ...... 385/37
2002/0150363 A1 * 10/2002 Bonfrate et al. ........ 385/122

* cited by examiner

Primary Examiner—Hemang Sanghavi
Assistant Examiner—Scott Knauss
(74) Attorney, Agent, or Firm—Blakely, Sokoloff, Taylor & Zafman

(57) ABSTRACT

A method for forming two conductive films isolated electrically from each other on the surface of a fiber is provided. According to the method, a fiber is attached into the grooves on a silicon substrate using photoresist as glue. A photoresist pattern for a conductive film on the surface of the fiber is formed by a photolithography process. After wet-etching some amount of the fiber on the patterned area, which is needed for lifting off a metal film deposited on the unnecessary area, a metal film is deposited over whole area of the wafer. Removing photo-resist by a heated stripper solution leaves a metal film only on the patterned area of the fiber and detaches the fibers from the grooves of the wafer The second metal film on the other side of the fiber can be formed by the same procedures as the first metal film except that the deposited surface of the fiber must be attached to the grooves upside down. The poled fiber using two conductive films can be applied to manufacture elements used in opto-electronic and fiber communication devices such as a modulator, a tunable filter and a switch, an electric field sensor, and a nonlinear fiber optics device such as a frequency converter, a dispersion compensator.

25 Claims, 9 Drawing Sheets

METHOD FOR FORMING TWO THIN CONDUCTIVE FILMS ISOLATED ELECTRICALLY FROM EACH OTHER ON A FIBER

This application relies for priority upon Korean Patent Application No. 2001-78667, filed on Dec. 12, 2001, the contents of which are herein incorporated by reference in its entirety.

BACKGROUND OF THE INVENTION

1. Field of the Invention

The present invention relates to the fields of fiber optics, and more particularly, to a method for forming two thin conductive films that can be used as electrodes for poling on a single mode fiber or a multimode fiber.

2. Description of the Related Art

A crystal material such as $LiNbO_3$ or $BaTiO_3$ has been widely used as the optical nonlinear material. An amorphous material has no inversion symmetry, which means vanishing electro-optic and second order nonlinear coefficients. However, since amorphous silica glass materials were reported to have electrooptic and nonlinear optical properties by poling them under several different conditions, a lot of researches and progresses have been focused on the optoelectronic devices made of glass materials, for a possibility of integrating all glass, or specifically all fiber, active devices into a system. It has been suggested that packaging cost and optical power loss can be significantly reduced by making all the active devices out of glasses or fibers and integrating them into a system. Modulation speed and transmission rate can also be enhanced by integrating the active devices made of glasses or fibers into a system.

To induce and enhance the second order effect on a glass material, two techniques are well-known, thermal poling and UV poling. In thermal poling, a high electric field of a typical value of ~100 V/μm is applied to a glass material with heating to a desired temperature, typically 250° C. to 300° C., then the material is allowed to cool to room temperature with the high electric field still applied. In UV poling, a glass material is irradiated by UV light, typical wavelength of 150 nm to 400 nm, with the high electric field applied. Both methods, thermal and UV poling, may be applied together to a glass material at the same time.

To apply a high electric field to a single mode fiber, a typical diameter of 125 μm, requires well-tailored techniques and clever designing of electrodes to be located as close as allowed to the core of a fiber, and also requires isolation schemes to allow ~100 V/μm high electric field without breakdown.

The prior arts introduce several different designs to locate electrodes in appropriate positions with desired patterns [U.S. Pat. No. 5,617,499]. With reference to FIGS. 1A through 1D, a first electrode 12 is formed on a wafer 11. A polyimide 13 is applied in order to attach a D-shape fiber 10 to the wafer 11 with the flat side down. Then, as a dielectric insulator, a thick polyimide layer 14 is deposited. The upper parts of the polyimide layer 14 and the fiber 10 are polished and a polished side is formed on the opposite side of the flat side of the fiber 10. A second electrode 15 is formed on the polished side. If the electric field is applied to the fiber 10 through the first electrode 12 and the second electrode 15, the electro-optical coefficient is induced.

Though adequate in some respects, these kinds of prior arts, which consist of the processes of the permanent attachment of the fiber to a substrate, polishing, depositing a polyimide layer as a dielectric insulator, and spin coating, have inevitable shortcomings. The permanent attachment of the fiber 10 to a substrate 11 requires additional packaging and handling costs for later use of a device and also reduces compactness. Depositing electrodes 12 and 15 not on the fiber surface itself, but on the polished surface and the substrate may result in an unstable and non-uniform electric field, which is caused mainly by the imperfectness of the polished surface and the polyimide glue layer 13 between the fiber 10 and the substrate 11, which may also be a cause of a lack of reproducibility. Polishing a fiber is a difficult and costly process because polishing accuracy must be high due to the small size of the fiber. This is especially difficult and costly for long fiber distances. Depositing a polyimide layer 14 as a dielectric insulator also has a shortcoming that the polyimide layer 14 allows some amount of leakage current, especially in a high temperature under a high voltage. In our experiment we suffered a serious problem where extended ends 18 and 19 of the fiber 10 away from the substrate 11 were really weak such that the spin-coating was hardly allowable. Here, the extended ends of the fiber are necessary pieces that are used for splicing with external fiber ends.

FIG. 2 shows another prior art to induce and enhance electro-optic and nonlinear effects on a fiber 30 [U.S. Pat. No. 5,966,233]. The fiber 30 has two holes running parallel to a core 33 with pre-designed distances, where the two holes accommodate two thin electrode wires 31 and 32 inserted from each end of the fiber. Through the electrode wires 31 and 32, the electric field is applied to the fiber 30 for UV or thermal poling, or both together. According to the method, the electro-optical coefficient was obtained to the value of maximum 6 pm/V that is practicable enough to facilitate the configuration of a nonlinear element using a silica fiber. Coupling the fiber to other fibers is difficult because the electrodes 31 and 32 must exit the fiber, preventing direct butt coupling or fusion splicing to other fibers. It is also very difficult to push the fragile electrode wires into the end of the fiber, henceforth the manufacturing cost and time are significant drawbacks. Inserting electrode wires from each end of the fiber means that the modulation frequency, if embodied into a modulator, is limited to low values since a high-speed traveling wave geometry is not possible.

Prior art U.S. Pat. No. 5,966,233 disclosing the design shown in FIG. 3 suggests some improvements to the art in FIG. 2, removing the problem of inserting electrode wires into the holes, thereby making possible fusion splicing to other fibers and allowing a high-speed traveling wave geometry. In this method, grooves 64 and 65 are formed on the surface of a fiber 60 along the length direction of the fiber. Electrodes 69 are placed on the grooves 64 and 65. The electric field is applied through the electrodes for poling.

Both the prior arts shown in FIGS. 2 and 3, however, still have a serious drawback that a patterned electrode such as a periodic pattern to meet the quasi-phase matching condition is very difficult to realize. Up to the present time, as far as we know, there have been no publications reporting that a significant result of nonlinear effects, such as Second Harmonic Generation (SHG), Difference Frequency Generation (DFG) or Sum Frequency Generation (SFG), four wave mixing etc., was obtained using a patterned electrode under the schemes shown in FIG. 2 and FIG. 3. One shortcoming related to the prior arts shown in FIG. 2 and FIG. 3 is that the diameters of their fibers, ~300 μm, to accommodate two electrode wires are much larger than a standard single mode fiber, ~125 μm, meaning that, although it is not impossible, the fusion splicing of their fibers with the standard single mode fiber is very difficult and allows a lot of power loss.

SUMMARY OF THE INVENTION

To solve the problems described above, it is an object of the present invention to provide a method for forming two thin conductive films that can be used as electrodes for poling on an optical fiber, addressing the problems of prior arts.

To achieve the above object, in accordance with the present invention, two conductive films isolated electrically from each other are deposited on the surface of a fiber that may be used as an optoelectronic device in an optical communication system. According to the present invention, D-shape fibers are attached into grooves on a silicon wafer substrate, and photoresist is used as glue. The wafer is prepared by forming grooves by wet-etching and coating photo-resist in the grooves to accommodate the fiber without a step difference to the surface of the substrate. After conducting a well-designed cleaning procedure to remove the dirty extra photo-resist on the top surface of the fiber during the attachment procedure, a photoresist pattern is formed on the top surface of the fiber by a photolithography process, where specific conditions must be established in each step.

After wet-etching some amount of the fiber on the patterned area, which is needed for lifting off a metal film deposited on the unnecessary area, a metal film is deposited over whole area of the wafer. Removing photo-resist by a heated stripper solution leaves a metal film only on the patterned area of the fiber and detaches the fibers from the grooves of the wafer. The second metal film on the other side of the fiber can be formed by the same procedures as the first except that the deposited surface of the fiber must be attached to the grooves upside down, where the size of the grooves for the plat side down is different from the size for the round side down. In the final step, an insulation film such as an oxide layer is deposited on the metal films to protect them from electrical and mechanical damages. The method of the present invention can be applied to a circular single mode fiber, a multimode fiber or a D-shape fiber.

A fiber manufactured according to the above processes is almost completely free from the drawbacks mentioned above, free from the permanent attachment to a substrate, free from the polishing process, and free from the polyimide insulating layer, and such a fiber allows fusion splicing and direct butt coupling to the standard single mode fiber, allows the high speed traveling wave geometry, and allows patterned films of any shape. Although the two metal films (further, conductive films) isolated electrically are used as electrodes to apply an electric field to an optical fiber for poling now, they are expected to be used in various applications in the future. For example, the conductive films may be used to apply currents to induce the difference of temperatures between two films. In addition, if the two conductive films are made up of different materials, then the difference of reflection, refractive index and stress across the fiber can be induced.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1A:
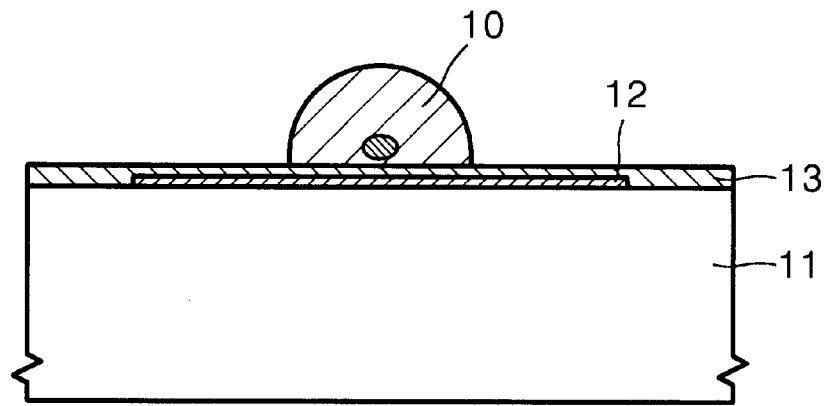
FIGS. 1A through 1D, and FIGS. 2 and 3 show prior arts describing how to bring the electrodes close to the core using D-shape fiber.
Figure 1B:
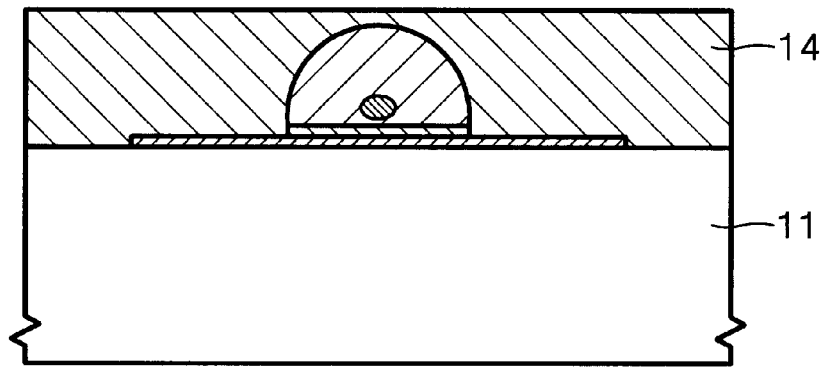
Figure 1C:
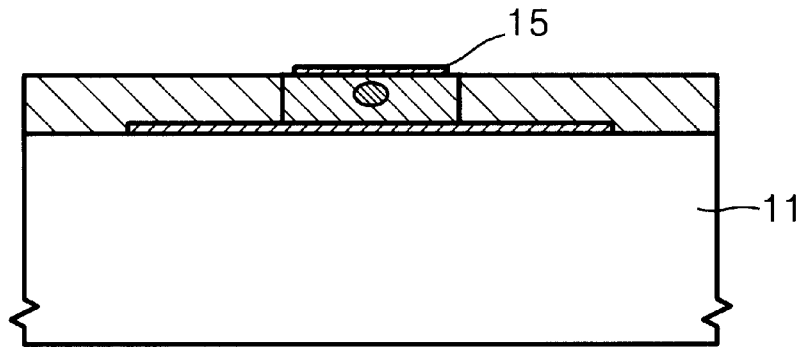
Figure 1D:
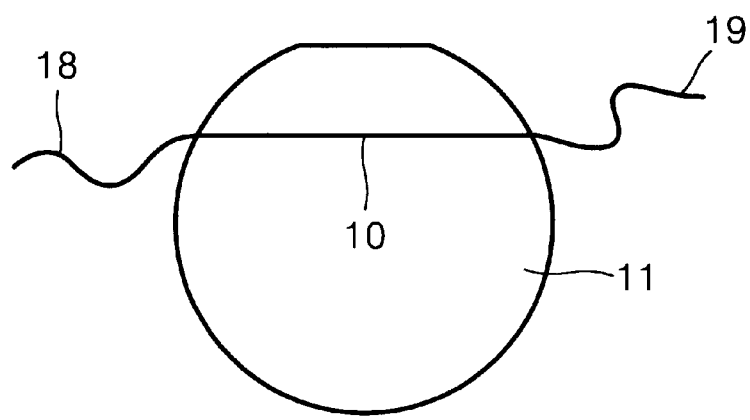
Figure 2:
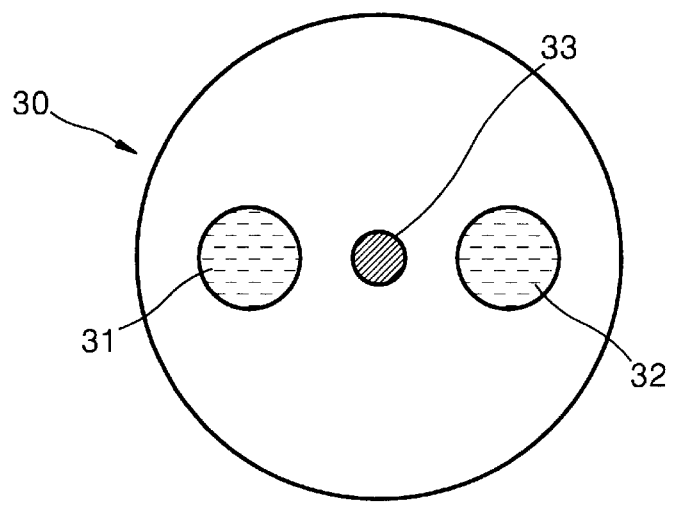
Figure 3:
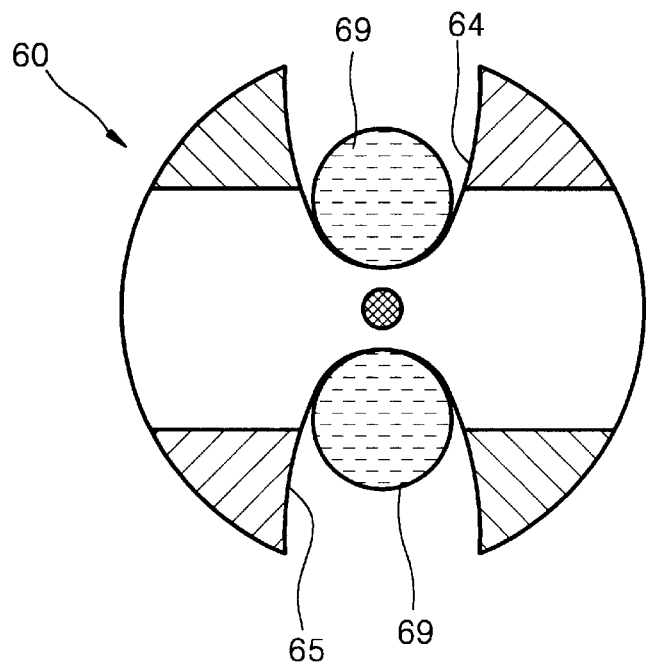

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the same reference marks denote the same elements. Various elements and sections are briefly depicted. Therefore, the present invention is not limited by the relative size and interval shown in the attached drawing.

FIGS. 4 through 7, and FIGS. 8A through FIGS. 8C explain a method for forming conductive films on an optical fiber according to an embodiment of the present invention. The method of the present invention can be applied to a circular single mode fiber, a multimode fiber or a D-shape fiber. The present embodiment explains the method for forming two metal films that are isolated electrically from each other on the D-shape fiber.

Figure 4:
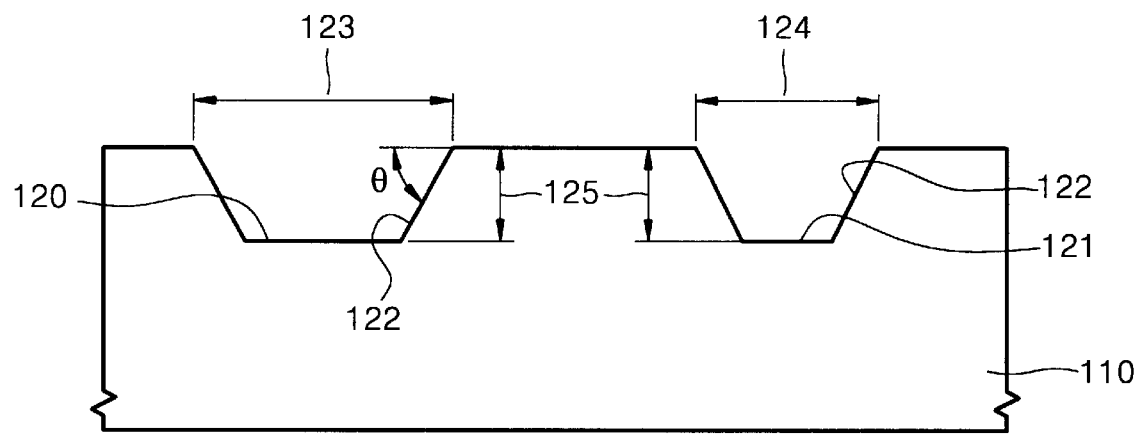
FIGS. 4 through 7, and FIGS. 8A through FIGS. 8C explain a method for forming conductive films on an optical fiber according to an embodiment of the present invention.

With reference to FIG. 4, the first groove 120 and the second groove 121, which are used for the present embodiment, are formed on a (100)-type silicon substrate. The procedure for forming the grooves 120, 121 makes use of the difference of etch rates along the directions between <100> and <111> on the silicon substrate 110. As known well, since the etch rate along <100> is much faster than that along <111>, etching the silicon substrate 110 under appropriate conditions can form the grooves 120, 121 that have the shapes shown in FIG. 4. The slope 122 of the grooves 120, 121 is 54.74° ($\theta$) with respect to the surface of the silicon substrate 110, which is the angle between <100> and <111> directions. 45% KOH solution can be used as an etchant in the temperature of 85° C.

In our embodiment the size, 227 $\mu$m, of the first groove 120 is different from the size, 166 $\mu$m, of the second groove 121, where the first groove 120 is for flat side up and the second one 121 for plat side down. All sizes are calculated to be fit to the D-shape standard single mode fiber, 125 $\mu$m diameter, 5 $\mu$m distance from core to the plat surface, the depth 125 being 71.5 $\mu$m. If necessary, the D-shape fiber may be wet-etched to adjust the distance from the core to the flat surface, and the sizes of grooves can be determined to meet the adjusted size of the fiber. Although the first and the second grooves are formed on the same substrate in our embodiment, those grooves may be formed on different silicon substrates, if needed.

Figure 5:
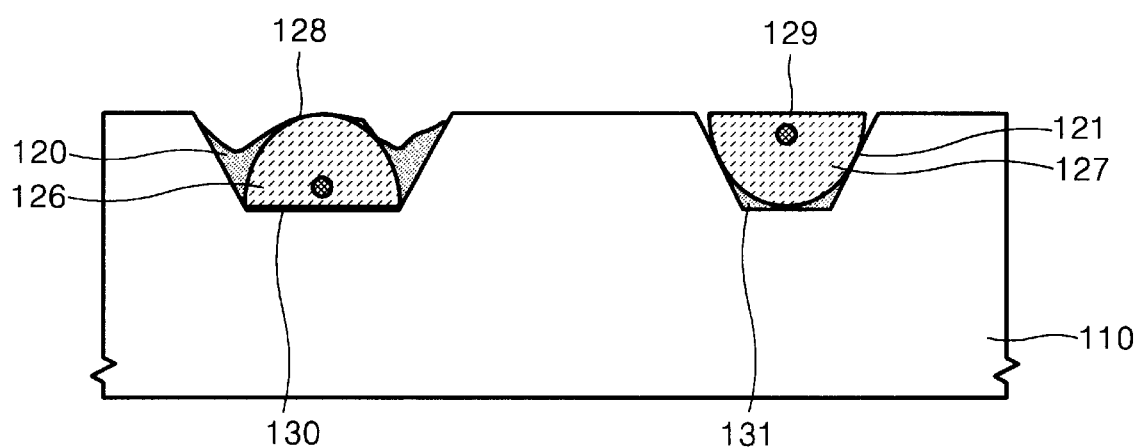

With reference to FIG. 5, photoresists 130 and 131 are used to attach the first D-shape fiber 126 and the second D-shape fiber 127 to the first groove 120 and the second groove 121, respectively. Attaching the D-shape fibers 126 and 127 to the grooves 120 and 121 is quite important for a subsequent process and requires repeated experiences. First, the grooves 120, 121 are filled with photoresists 130 and 131, being followed by laying the fibers down into the grooves, where the photo-resist may be the same kind as one used for electrode patterns. Next, the top surfaces 128, 129 of the fibers should be clean enough to allow very fine patterns of electrodes. For the cleaning, we scrubbed the fibers with a cotton tip very smoothly, and then they are exposed to the radiation for a time that the photo-resist on the top of the fibers takes enough radiation to be developed, while the photo-resist on the bottom takes the amount of radiation not to be developed, so that the photo-resist 130, 131 on the bottom might not loose a glue property. The wafer containing our fibers is dipped into the developer solution until the top surfaces of the fibers are clean enough, but the fibers are still attached to the grooves, subsequently rinsing it using enough water.

Another method to remove the photoresist from the surfaces 128 and 129 of the D-shape fibers 126 and 127 is to polish the surface of the silicon substrate 110 with the surfaces 128 and 129 of the fibers as high as the surface of the silicon substrate 110 or higher than the surface of the silicon substrate 110 by several $\mu$ms by adjusting the depth of the grooves 120 and 121 and the thickness of the photoresist 130 and 131. Since the polishing rate of the photoresist is much faster than that of the surface of the silicon substrate or the fiber, only the photoresist on the surfaces 128 and 129 can be removed. In this method, bubbles that appear at the side of the fibers can be reduced, mainly because the photoresist at the side and the bottom of the fibers are not attacked by the developer solution to prevent air-sneaking. If the top surfaces of the fibers are not dirtied in the process of fiber attachment by some way, the complex cleaning procedures are not needed.

Figure 6:
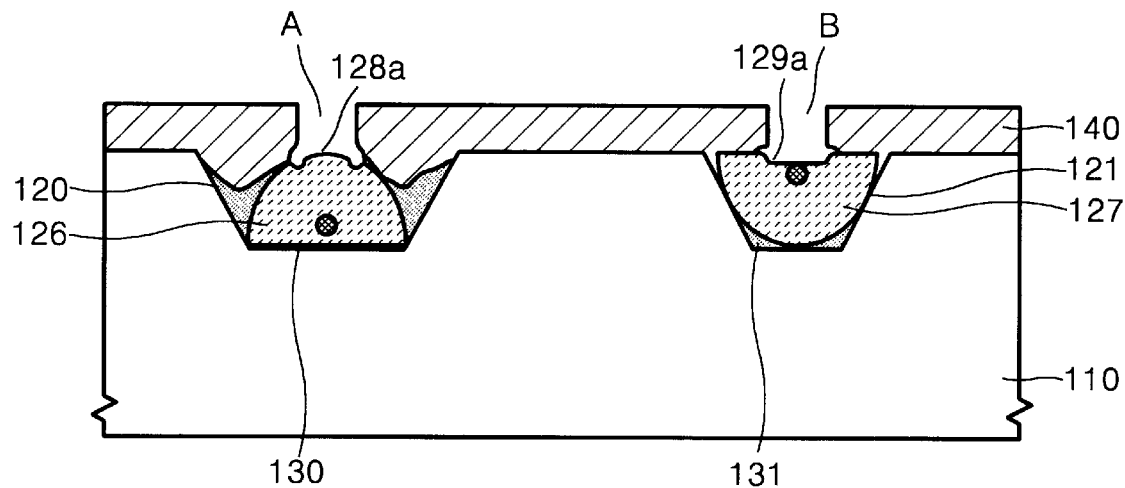

Before the patterning procedure shown in the FIG. 6, the wafer containing our fibers is exposed in a vapor state to HMDS, a liquid material promoting adhesion between photo-resist and the surface under photo-resist. The electrode patterns 132, 133 are achieved by the photolithography processes, spin-coating photo-resist, pre-baking, exposing to radiation, developing, rinsing, post-baking, with involving some extra steps needed for the very rough surface of the wafer due to grooves and fibers. Photo-resist 134 is coated doubly or triply to compensate for the weakness of the photo-resist on the top surfaces of the fibers, in steps that photo-resist is coated on the wafer first, then pre-baked in an appropriate temperature, subsequently repeating these steps doubly or triply. The amount of radiation to be exposed need to be adjusted carefully by repeated trials to avoid an over-dose of radiation, because the over-dose of radiation may deteriorate the patterns quite drastically due to the scattered light refracted into the fibers. The temperature of post-baking must be lower than that of pre-baking, or post-baking may be omitted, to avoid the serious damages induced by the fact that some amount of gas emitted from the photo-resist on the bottom of the grooves during post-baking, if the temperature is high enough, makes bubbles on the sides of the fibers 126, 127, which may destroy electrode patterns.

Before electrode metals are deposited, some (~1 $\mu$m) thickness of the fiber surfaces under the electrode patterns 128a, 129a is etched away isotropically by Buffered Oxide Etchant (BOE) to make easy lifting off the metal film deposited on the photo-resist. After depositing an electrode metal film, Au, for example, the wafer is dipped into a heated stripper solution (~150° Celsius), which removes the metal film deposited on photo-resist, leaving it only on the patterned area of fiber surface, at the same time, detaching the fibers from the grooves in the wafer. To deposit metal films on the opposite side of the fibers, we follow the exact same procedures described above just after fibers are laid upside down into the right sizes of the grooves. As a final step, if needed, an oxide ($SiO_2$) or nitride ($SiN_4$) layer is deposited on the metal film to protect it from chemical and mechanical damages using CVD or an evaporation method that allows oxide or nitride deposition in a temperature below the melting point of the metal film used.

Figure 7:
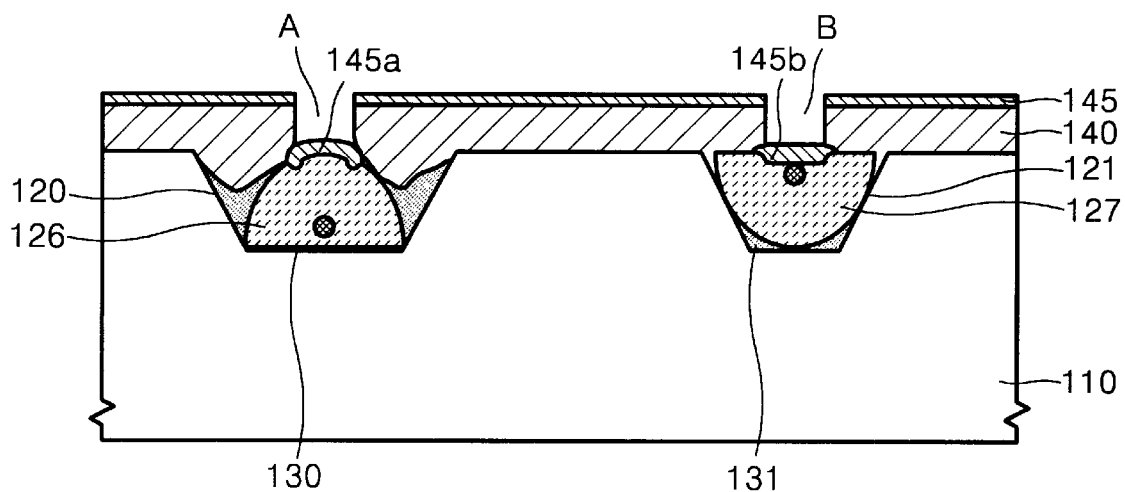

In our embodiment, a thermal or E-beam evaporator was used to deposit the metal films, ~1000 Å of Au, insitu, after ~100 Å of Cr was deposited as an adhesion layer. We found that more than 100 Å of Cr layer was necessary to keep the metal film from peeling off from the fiber surfaces through the whole processes. Any other metal films (Cr layer, Al layer, Cu layer, Ag layer) may also be used as a conductive film. In addition, it is obvious that any conductive films that can be formed on an oxide surface of silica optical fiber may also be used. For example, a conductive polymer film or a doped semiconductor film can be formed as a conductive film. FIG. 7 show the conductive film 145 formed on the photoresist pattern 140 and conductive films 145a and 145b formed on the surfaces 128a, 129a of the fibers.

Figure 8A:
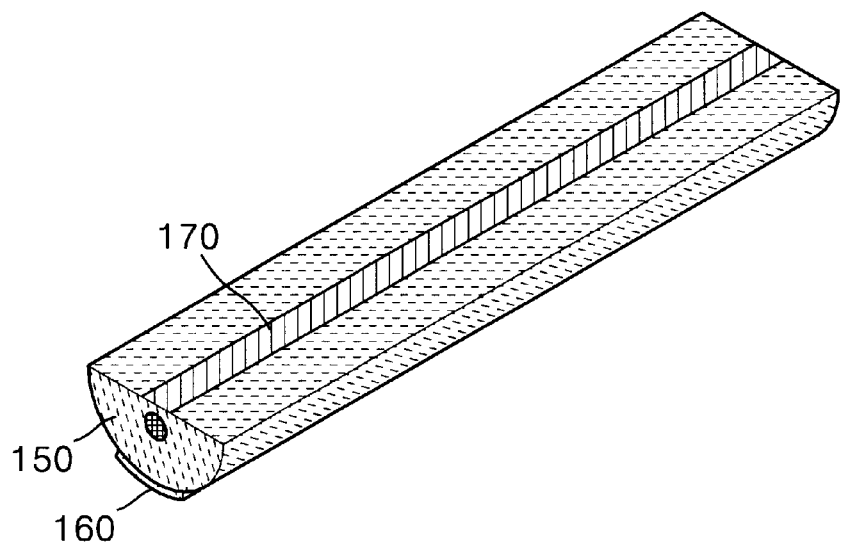
Figure 8B:
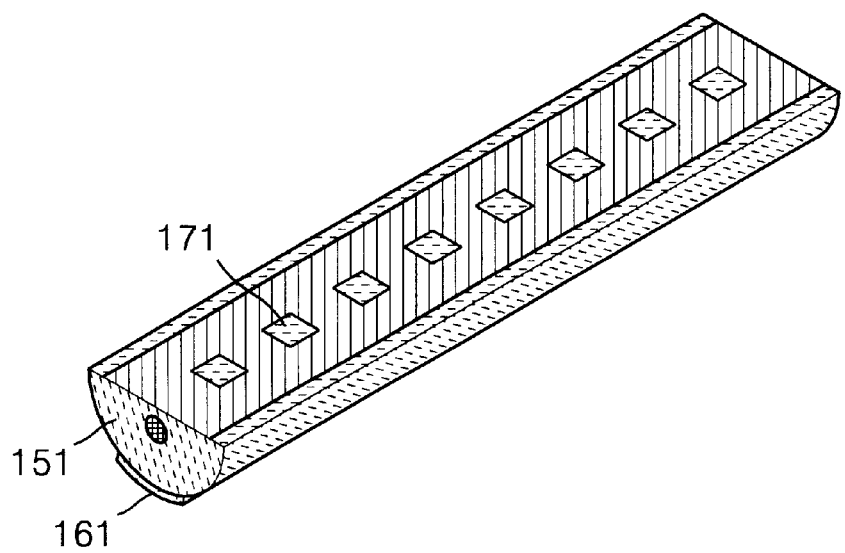
Figure 8C:
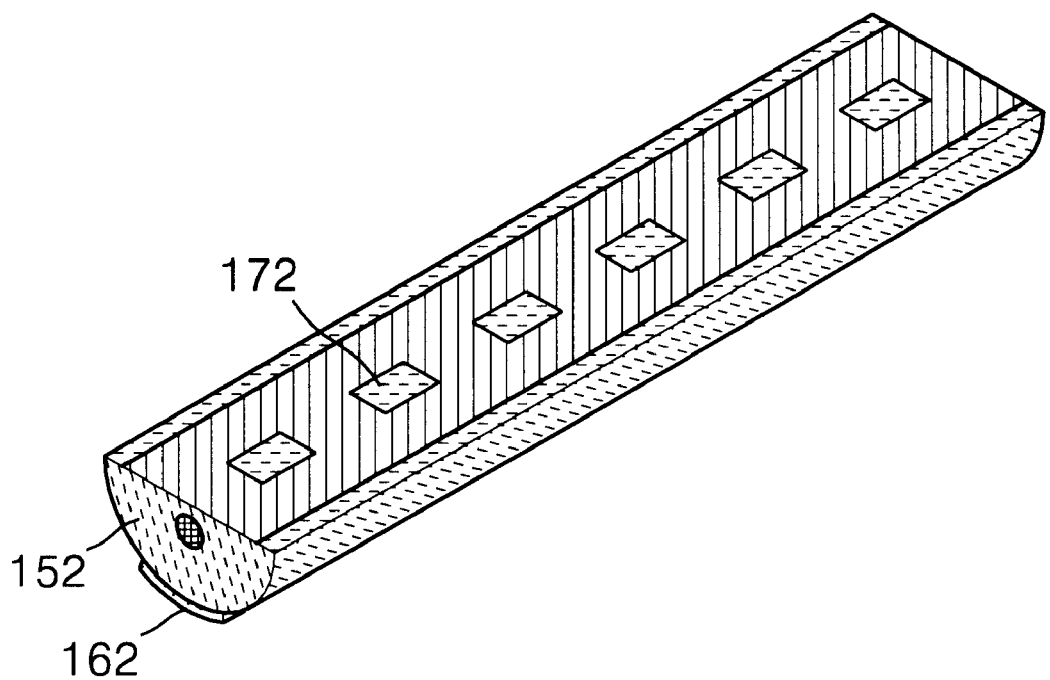

FIGS. 8A through 8C show examples of fibers that have two metal films isolated electrically according to embodiments of the present invention. First, FIG. 8A shows the D-shape fiber 150 that has a 60 $\mu$m-wide stripe-shaped metal film 160 on the round surface and a 20 $\mu$m-wide stripe-shaped metal film 170 on the flat surface. FIG. 8B shows the D-shape fiber 151 that has a 60 $\mu$m-wide stripe-shaped metal film 161 on the round surface and a 42 $\mu$m-period ladder-shaped metal film 171 on the flat surface. FIG. 8C shows the D-shape fiber 152 that has a 60 $\mu$m-wide stripe-shaped metal film 162 on the round surface and a 66 $\mu$m-period ladder-shaped metal film 172 on the flat surface. For reference, the ladder-shaped metal film can also be formed on the round surface of the fiber. However, it is implemented on the flat surface in the present embodiment.

Figure 9A:
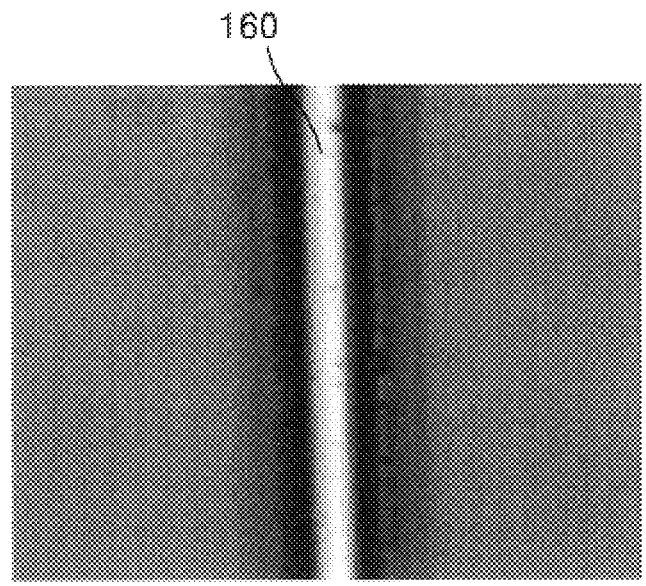
FIGS. 9A through 9D are microscope pictures showing conductive films formed on the optical fiber according to the experimental embodiment of the present invention.
Figure 9B:
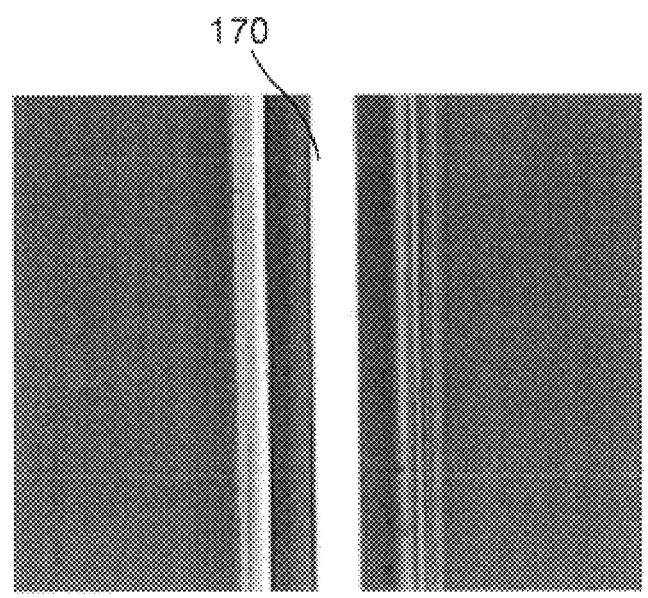
Figure 9C:
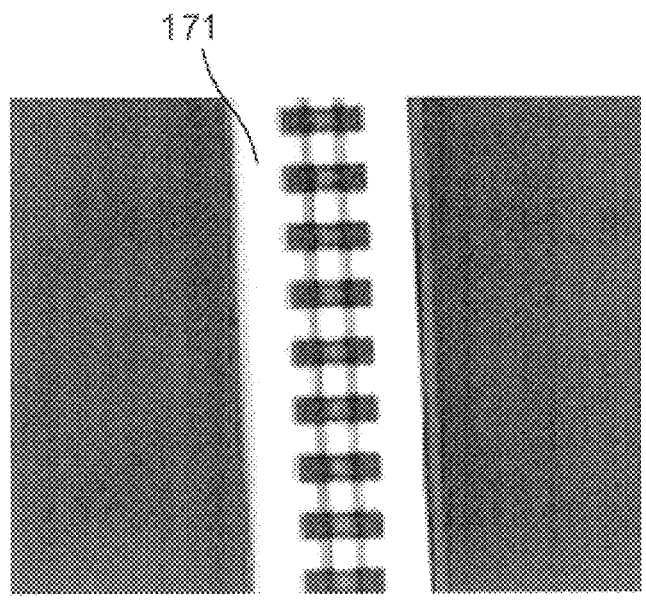
Figure 9D:
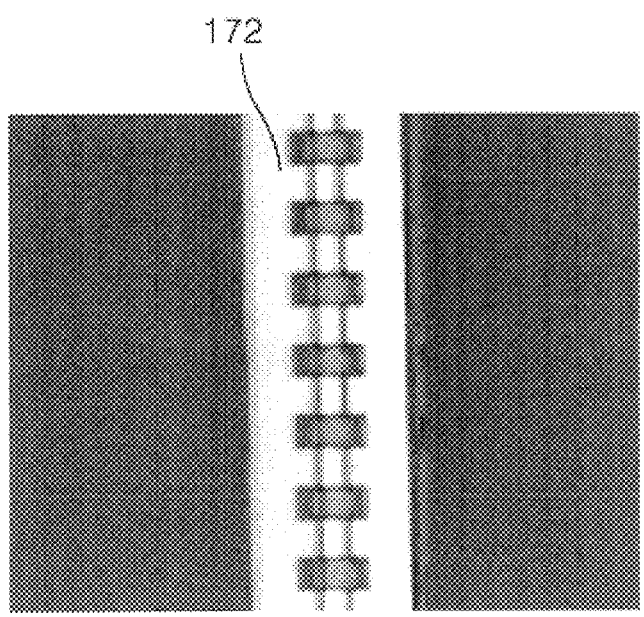

FIGS. 9A through 9D are microscope images of the real samples processed completely in FIGS. 8A through 8C. The Au layer is formed as a metal film. FIG. 9A shows the 60 $\mu$m-wide stripe-shaped metal film 160 formed on the round surface of the D-shape fiber 150. FIG. 9B shows the 20 $\mu$m-wide stripe-shaped metal film 170 formed on the flat surface of the D-shape fiber 150. FIG. 9C shows the 42 $\mu$m-period ladder-shaped metal film 171 formed on the flat surface of the D-shape fiber 151. FIG. 9D shows the 66 $\mu$m-period ladder-shaped metal film 172 formed on the flat surface of the D-shape fiber 152. Although the two metal films (further, conductive films) isolated electrically are used as electrodes to apply an electric field to an optical fiber for poling in our embodiment, they may be used in various applications in the future. For example, the conductive films may be used to apply currents to induce the difference of temperatures between two films. In addition, if the two conductive films are made up of different materials, then the difference of reflections, refractive indices and stresses across the fiber can be induced. Especially, according to the present invention, the conductive film can be formed on the fiber in any patterns including a high speed traveling wave geometry and a periodical pattern. Forming the conductive film on the fiber according to the method of the present invention and poling the fiber through the conductive films can be applied to opto-electronic and fiber communication devices such as modulators, tunable filters and switches, electric field sensors, and nonlinear fiber optics devices such as frequency converters, dispersion compensators by using SHG or Difference Frequency Generations (DFG).

Although specific embodiments of the invention have been described herein for illustrative purposes, various modifications and equivalents thereof can be made without departing from the spirit and scope of the invention, as will be recognized by those skilled in the relevant art. Accordingly, the invention is not limited to the disclosure, but instead its scope is to be determined entirely by the following claims.

As described above, according to the present invention, it is possible to form two conductive films isolated electrically each other on the surface of a fiber such as a D-typed fiber and a standard single mode fiber. That is, the present invention secures a state-of-the-art technology that enables two conductive films isolated electrically to be formed on the surface of the very fine fiber.

A fiber manufactured according to the above processes is almost completely free from the drawbacks mentioned at the description of previous arts, free from the permanent attachment to a substrate, free from the polishing process, and free from the polyimide insulating layer, and such a fiber allows fusion splicing and direct butt coupling to the standard single mode fiber, allows the high speed traveling wave geometry, and allows patterned films of any shape.

Therefore, the fiber having two conductive films according to the method of the present invention and poling the fiber through the conductive film can be applied to opto-electronic and fiber communication devices such as modulators, tunable filters and switches, electric field sensors, and nonlinear fiber optics devices such as frequency converters, dispersion compensators by using SHG or DFG, for WDM.

What is claimed is:

1. A method for forming two conductive films isolated electrically from each other on the surface of a fiber comprising:
   (a) forming grooves on a silicon substrate, width and depth of which are adjusted to accommodate the fiber without a substantial step difference from a surface of the silicon substrate;
   (b) attaching the fiber into the grooves using a photoresist;
   (c) forming a photoresist pattern designed to form the conductive films on the surface of the fiber in a desired pattern;
   (d) depositing the conductive films on an area where the photoresist pattern is formed;
   (e) removing the photoresist while leaving the conductive film on the patterned area of the fibers, separating the fiber from the grooves
   (f) repeating steps (a) to (e) to coat a conductive film on an opposite side of the said fiber.

2. The method of claim 1, wherein a procedure for forming the grooves makes use of a difference between etch rates in two different directions on the silicon substrate.

3. The method of claim 1, wherein a 45% KOH solution can be used as an etchant in the temperature of 85° C. in order to form the grooves.

4. The method of claim 1, wherein a distance from the core to a flat surface of the fiber is adjusted in advance.

5. The method of claim 1, wherein (b) comprises:
   filling photoresist in the grooves; and placing the fiber on the grooves filled with the photoresist so that a side to have conductive films is laid up.

6. The method of claim 1 further comprising:
   removing dirty extra photoresist on a top surface of the fiber during the attachment procedure.

7. The method of claim 6, wherein removing the photoresist comprises:
   exposing the substrate to radiation for a time that the photo-resist on the top of the fibers takes enough radiation to be developed, while the photoresist on the bottom takes an amount of radiation not to be developed, so that the photo-resist on the bottom does not lose a glue property, and developing and removing the exposed photoresist on the fiber.

8. The method of claim 6, wherein removing the photoresist comprises:
   polishing a surface of the silicon substrate after making the surface of the fiber as high as the surface of the silicon substrate or higher than the surface of the silicon substrate by several micrometers by adjusting the depth of the grooves and the thickness of the photoresist.

9. The method of claim 1, wherein (c) comprises:
   (c-1) coating the photoresist on the silicon substrate where the fiber is attached;
   (c-2) pre-baking the photoresist;
   (c-3) exposing the substrate to radiation;
   (c-4) developing the exposed photoresist; and
   (c-5) cleaning the developed photoresist.

10. The method of claim 9, wherein the silicon substrate is exposed in a vapor state to HexaMethylDisilazane (HMDS) before (c-1).

11. The method of claim 9, wherein (c) further comprises: post-baking the cleaned photoresist after (c-5).

12. The method of claim 11, wherein a temperature of the postbaking must be lower than that of the pre-baking.

13. The method of claim 9, wherein (c-1) and (c-2) are repeated at least twice to compensate for weakness of the photoresist on a rough surface of the silicon substrate.

14. The method of claim 1 further comprising before (d):
   that an opened area of the surface of the fiber is wet-etched isotropically by Buffered Oxide Etchant (BOE) to make easy lifting off the conductive film deposited on the photoresist and to enhance adhesion of the conductive film on the fiber.

15. The method of claim 1, wherein an Au layer as a conductive film is formed.

16. The method of claim 15, wherein a Cr layer is deposited as an adhesion layer before the Au layer is formed.

17. The method of claim 16, wherein the thickness of the Cr layer is 100 Å or more.

18. The method of claim 16, wherein the Cr layer and the Au layer are formed insitu.

19. The method of claim 1, wherein a Cr layer, Al layer, Cu layer, Ag layer, a conductive polymer layer or a doped semiconductor layer can be formed as a conductive film.

20. The method of claim 1 further comprising after (e):
   forming an insulation film on the conductive films in order to protect the conductive films from chemical and mechanical damages.

21. The method of claim 20, wherein the insulation layer can be an oxide ($SiO_2$) film, a nitride ($SiN_4$) film or a polyimide layer.

22. The method of claim 1, wherein the optical fiber is a circular single mode fiber, a multimode fiber or a D-shape fiber.

23. The method of claim 1, wherein the conductive film formed on the fiber has a periodical ladder-shaped pattern for quasi-phase matching.

24. The method of claim 1 further comprising after (e):
   poling the fiber by applying an electric field to the conductive films after (e) so that the fiber having two conductive films is used to manufacture elements used in opto-electronic and fiber communication devices including a modulator, a tunable filter and a switch, an electric field sensor, and a nonlinear fiber optics device including a frequency converter, a dispersion compensator.

25. The method of claim 1, wherein the two conductive films are made up of different material films so that a difference of reflections, refractive indices and stresses across the fiber can be induced.

* * * * *